(12) United States Patent
Corbin et al.

(10) Patent No.: US 8,576,049 B2
(45) Date of Patent: Nov. 5, 2013

(54) DOCUMENT AUTHENTICATION AND IDENTIFICATION

(75) Inventors: George E. Corbin, Poughkeepsie, NY (US); Anthony Grech, Poughkeepsie, NY (US); Thomas E. Murphy, Jr., Poughkeepsie, NY (US); Mark Nelson, Poughkeepsie, NY (US); Kevin H. Peters, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 720 days.

(21) Appl. No.: 12/564,982

(22) Filed: Sep. 23, 2009

(65) Prior Publication Data

US 2011/0072271 A1  Mar. 24, 2011

(51) Int. Cl.
| | |
|---|---|
| *H04L 9/32* | (2006.01) |
| *G06F 17/00* | (2006.01) |
| *G06F 19/00* | (2011.01) |
| *G06F 7/00* | (2006.01) |
| *G06F 7/04* | (2006.01) |
| *G06K 13/00* | (2006.01) |
| *H04Q 9/00* | (2006.01) |
| *G05B 19/00* | (2006.01) |
| *G05B 23/00* | (2006.01) |
| *G08B 29/00* | (2006.01) |

(52) U.S. Cl.
USPC .......... 340/5.86; 235/492; 235/375; 235/385; 713/176; 340/5.2; 340/5.3; 340/5.51; 340/5.6; 340/5.74

(58) Field of Classification Search
USPC ........ 340/5.2–5.27, 5.3, 5.51, 5.6, 5.65, 5.67, 340/5.74, 5.8, 5.86; 713/176; 358/1, 1.15, 358/1.4, 1.1, 3.28; 235/492, 375–385
See application file for complete search history.

(56) References Cited

U.S. PATENT DOCUMENTS

| | | | |
|---|---|---|---|
| 5,629,770 | A | 5/1997 | Brassil et al. |
| 6,970,870 | B2 | 11/2005 | Dweck et al. |
| 7,239,404 | B2 | 7/2007 | Fukushima |
| 7,293,098 | B2 | 11/2007 | Sandhu et al. |
| 7,387,261 | B2 | 6/2008 | Onishi |
| 2003/0145206 | A1* | 7/2003 | Wolosewicz et al. ......... 713/176 |
| 2004/0249817 | A1 | 12/2004 | Liu |
| 2005/0066174 | A1 | 3/2005 | Perlman |

(Continued)

OTHER PUBLICATIONS

Chris Alexander, et al., Improved User Authentication in Off-The-Record Messaging, WPES '07, Oct. 29, 2007, 7 pages.

(Continued)

*Primary Examiner* — Benjamin C Lee
*Assistant Examiner* — Christopher Gaines
(74) *Attorney, Agent, or Firm* — Cantor Colburn LLP; William A. Kinnaman, Jr.

(57) ABSTRACT

Computer-implemented methods, systems, and computer program products for document authentication and identification using encoding and decoding are provided. A method includes receiving a digitized document and comparing the digitized document to a set of markers to determine whether the digitized document is an encoded document with one or more characters replaced. In response to determining that the digitized document is encoded, information is extracted from the set of markers using a decoder according to an encoding strategy. The extracted information and the set of markers are compared with data stored in encoding history to authenticate and identify the received digitized document. Markers in the encoded document may be hidden in plain sight, such that the encoding is not readily apparent to a casual observer.

20 Claims, 6 Drawing Sheets

(56) References Cited

U.S. PATENT DOCUMENTS

| | | |
|---|---|---|
| 2005/0160271 A9* | 7/2005 | Brundage et al. ............. 713/176 |
| 2005/0177559 A1 | 8/2005 | Nemoto |
| 2006/0028689 A1* | 2/2006 | Perry et al. ................... 358/3.28 |
| 2006/0075241 A1* | 4/2006 | Deguillaume et al. ........ 713/176 |
| 2006/0101069 A1* | 5/2006 | Bell et al. .................... 707/103 R |
| 2006/0171559 A1* | 8/2006 | Rhoads ........................ 382/100 |
| 2006/0197928 A1 | 9/2006 | Hirai |
| 2006/0271787 A1* | 11/2006 | DeYoung et al. ............. 713/176 |
| 2007/0239792 A1 | 10/2007 | Chen et al. |
| 2007/0255744 A1 | 11/2007 | Gideoni |
| 2008/0005024 A1 | 1/2008 | Kirkwood |
| 2008/0010352 A1 | 1/2008 | Donoho et al. |
| 2008/0022112 A1 | 1/2008 | Silverbrook et al. |
| 2008/0052775 A1 | 2/2008 | Sandhu et al. |
| 2008/0085052 A1 | 4/2008 | Sasamori et al. |
| 2008/0126491 A1* | 5/2008 | Portele et al. ................. 709/206 |
| 2008/0126805 A1 | 5/2008 | Owlett et al. |
| 2008/0144936 A1* | 6/2008 | Nishikawa .................... 382/177 |
| 2008/0164328 A1 | 7/2008 | Burn |
| 2008/0177594 A1 | 7/2008 | Lamoureux et al. |
| 2008/0180709 A1 | 7/2008 | Tsuchitoi |
| 2008/0180753 A1 | 7/2008 | Maeno |
| 2008/0295013 A1* | 11/2008 | Evans et al. ................... 715/770 |

OTHER PUBLICATIONS

U.S. Appl. No. 12/564,993, filed Sep. 23, 2009.

* cited by examiner

SATISFACTION SURVEY

300

|  | DISAGREE | | | | | | | | | AGREE |
|---|---|---|---|---|---|---|---|---|---|---|
|  | | | | | (circle one) | | | | | |

Q1:
   OUR STAFF IS FRIENDLY. —302     1 2 3 4 5 6 7 8 9 10

Q2:
   OUR STORE IS WELL ORGANIZED. —304     1 2 3 4 5 6 7 8 9 10

.
.
.

Q10:
   WAIT TIME WAS ACCEPTABLE. —306     1 2 3 4 5 6 7 8 9 10

FIG. 3

SATISFACTION SURVEY

400

DISAGREE            AGREE
                                               (circle one)
Q1:                      ⟋302
    OUR STAFF IS FRIENDLY.                1 2 3 4 5 6 7 8 9 10

Q2:                         ⟋306
    WAIT TIME WAS ACCEPTABLE.             1 2 3 4 5 6 7 8 9 10

.
.
.

Q10:                         ⟋304
    OUR STORE IS WELL ORGANIZED.          1 2 3 4 5 6 7 8 9 10

FIG. 4

SATISFACTION SURVEY

500

DISAGREE                AGREE
                                                     (circle one)

Q1:                             —306
    WAIT TIME WAS ACCEPTABLE.          1  2  3  4  5  6  7  8  9  10

Q2:                       —302
    OUR STAFF IS FRIENDLY.               1  2  3  4  5  6  7  8  9  10

.

.

.

Q10:                           —304
    OUR STORE IS WELL ORGANIZED.      1  2  3  4  5  6  7  8  9  10

FIG. 5

DOCUMENT AUTHENTICATION AND IDENTIFICATION

BACKGROUND

The present invention relates generally to document authentication, and more specifically, to identification and authentication of documents in both digital and analog formats, including hard copies of documents.

A variety of approaches may be used to identify the source of a document; however, many approaches do not survive conversions between electronic (digital) format and analog (e.g., hardcopy) format. For example, electronic documents may include digital signatures that can be delivered along with the documents. The recipients of the documents can validate the electronic documents using the digital signatures. Since the digital signatures are delivered with the documents, the recipients know that the documents have been signed.

Another approach to identifying the source of a document is intentional injection of false information into the document, such as inclusion of intentionally misspelled words or false entries in a directory. Presence of the erroneous or false information can be used as identifiers about the origin of the document. The document recipient is usually not aware of the false information, which is easily detected and only contains information about the creator.

A further approach to identifying source information is electronic image modification to embed hidden information. For instance, steganography allows for injection of information into an electronic image without significantly altering image quality and can be used to tag the image. Note that printing the encoded image results in losing the hidden information. Thus, the information does not survive digital-to-analog (printing) and subsequent analog-to-digital (scanning) conversion processes.

An additional identification encoding technique includes tagging printouts with watermarks. For example, printers can be designed to print information about the printer, such as a serial number in a light yellow color and in a very small font that is not visible to the naked eye. However, this information typically does not survive the analog-to-digital (scanning) conversion process.

SUMMARY

An exemplary embodiment is a computer-implemented method for encoding identification information in a document. The method includes receiving a digitized document, creating a set of markers associated with identification information, and selecting an encoding strategy to apply the set of markers to the digitized document as identifying tags. The encoded document retains semantic content of the digitized document absent permission to modify the semantic content of the digitized document. The method also includes applying the set of markers to the digitized document according to the encoding strategy using an encoder to produce an encoded document with one or more characters replaced.

Another exemplary embodiment is a computer-implemented method for document authentication and identification. The method includes receiving a digitized document, and comparing the digitized document to a set of markers to determine whether the digitized document is an encoded document with one or more characters replaced. In response to determining that the digitized document is encoded, information is extracted from the set of markers using a decoder according to an encoding strategy. The extracted information and the set of markers are compared with data stored in encoding history to authenticate and identify the received digitized document.

A further exemplary embodiment is a system for document authentication and identification. The system includes an encoder configured to execute on a processing unit. The encoder receives a digitized document, creates a set of markers associated with identification information, and selects an encoding strategy to apply the set of markers to the digitized document as identifying tags. The encoded document retains semantic content of the digitized document absent permission to modify the semantic content of the digitized document. The encoder applies the set of markers to the digitized document according to the encoding strategy to produce an encoded document with one or more characters replaced or rearranged, and stores a record of the set of markers and encoding strategy associated with the encoded document as encoding history. The system also includes a decoder configured to execute on the processing unit. The decoder receives a returned digitized document and compares the returned digitized document to the set of markers to determine whether the returned digitized document is the encoded document with one or more characters replaced or rearranged. In response to determining that the returned digitized document is encoded, information is extracted from the set of markers according to the encoding strategy. The extracted information and the set of markers are compared with data stored in the encoding history to authenticate and identify the returned digitized document.

The methods described herein can also be tangibly embodied as computer program products on readable storage media. Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 3 depicts an example of an unmodified survey document;

FIG. 4 depicts an example of an encoded survey document in accordance with exemplary embodiments;

FIG. 5 depicts another example of an encoded survey document in accordance with exemplary embodiments.

The detailed description explains the preferred embodiments of the invention, together with advantages and features, by way of example with reference to the drawings.

DETAILED DESCRIPTION

Exemplary embodiments of the present invention provide computer-implemented encoding and decoding of identification information that survives both analog-to-digital and digital-to-analog conversion processes, such as scanning, copying, faxing and printing. Through applying encoding strategies to a set of markers and a document, an encoded document is produced. The encoded document may be "tagged" with information tied to document attributes and/or other data. For example, markers can be tied to an author, date/time, body content, recipients, or data derived therefrom. The resulting encoded document includes the information hidden in plain sight, but the information may not be readily apparent to a viewer of the encoded document.

Figure 1:
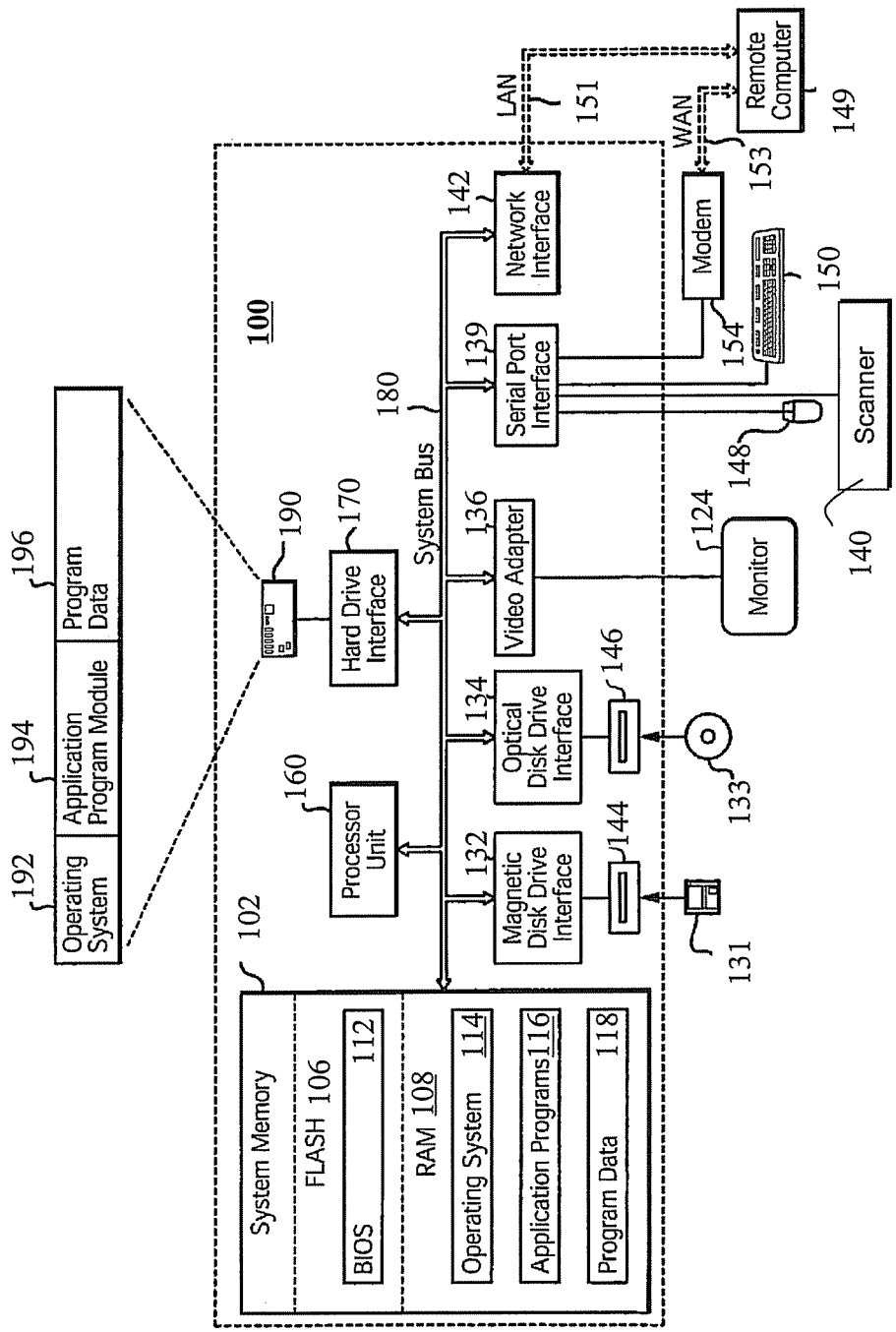
FIG. 1 depicts a block diagram illustrating an exemplary computer processing system that may be utilized to implement exemplary embodiments of the present invention.

Turning now to the drawings, it will be seen that in FIG. 1 there is a block diagram of a processing system 100 upon which a document authentication system can be implemented in exemplary embodiments. For discussion purposes, the processing system 100 is described as having features common to a personal computer, such as a desktop or portable computer. As used herein, however, the terms "processing system," "computer," and the like are intended to mean essentially any type of computing device or machine that is capable of receiving, storing, and running a software product, including such devices as communication devices and personal and home consumer devices supporting document authentication.

Processing system 100, as provided in FIG. 1, is configured as a personal computer that generally includes a processing unit 160 (or processing circuit), a system memory 102, and a system bus 180 that couples system memory 102 to processing unit 160. The system memory 102 includes non-volatile memory 106 and random access memory (RAM) 108. Non-volatile memory 106 is an electrically erasable programmable read only memory (EEPROM) module that includes a basic input/output system (BIOS) 112, which may be implemented in flash memory. BIOS 112 contains the basic routines that facilitate transfer of information between elements within processing system 100, such as during start-up.

Processing system 100 further includes a hard disk drive 190, a magnetic disk drive 144 (which can be used to read from or write to a removable disk 131), and an optical disk drive 146 (which can be used to read a CD-ROM disk 133 or read or write to other optical media). Hard disk drive 190, magnetic disk drive 144, and optical disk drive 136 are electrically communicatively coupled to system bus 180 by a hard disk drive interface 170, a magnetic disk drive interface 132, and an optical drive interface 134, respectively. The drives and their associated computer-readable media provide non-volatile storage for processing system 100. Although the description of computer-readable media above refers to a hard disk, a removable magnetic disk and a CD-ROM disk, it should be appreciated that other types of media that are readable by a computer, such as magnetic cassettes, flash memory cards, digital video disks, Bernoulli cartridges, and the like, may also be used in exemplary computer operating environments. Likewise, one or more of the hard disk drive 190, magnetic disk drive 144, and optical disk drive 146 can be omitted within the scope of the invention.

A number of program modules may be stored in the drives and RAM 108, including an operating system 114, application program modules 116 (such as, for example, development applications), and program data 118. A user may enter commands and information into processing system 100 through a keyboard 150 and/or a mouse 148. Physical documents can be input via scanner 140. Other input devices (not shown) may include, for example, a microphone, joystick, game pad, satellite dish, or the like. These and other input devices are often connected to processing unit 160 through a serial port interface 139 that is coupled to system bus 180, but may be connected by other interfaces, such as a game port or a universal serial bus (USB). A monitor 124 or other type of display device is also connected to system bus 180 via an interface, such as a video adapter 136. In addition to the monitor, the exemplary computer operating environment may also include other peripheral output devices (not shown), such as speakers or printers.

Processing system 100 may operate in a networked environment using logical connections to one or more remote computers, such as a remote computer 149. Remote computer 149 may be, for example, a server, a router, a peer device, or another common network node, and may include many or all of the elements described in relation to processing system 100. The logical connections depicted in FIG. 1 include a local area network (LAN) 151 and a wide area network (WAN) 153.

When used in a LAN networking environment, processing system 100 is connected to LAN 151 through a network interface 142. When used in a WAN networking environment, processing system 100 includes a modem 154 or other means for establishing communications over WAN 153, such as the Internet. Modem 154, which may be internal or external to processing system 100, is connected to system bus 180 via serial port interface 139. The modem 154 may also support transmission and reception of faxes via the WAN 153 or other communications networks not depicted, such as plain old telephone service (POTS). In a networked environment, program modules depicted relative to processing system 100, or portions thereof, may be stored in the remote memory storage device. It will be appreciated that the network connections shown are exemplary and other means of establishing a communications link between the computers may be used.

Figure 2:
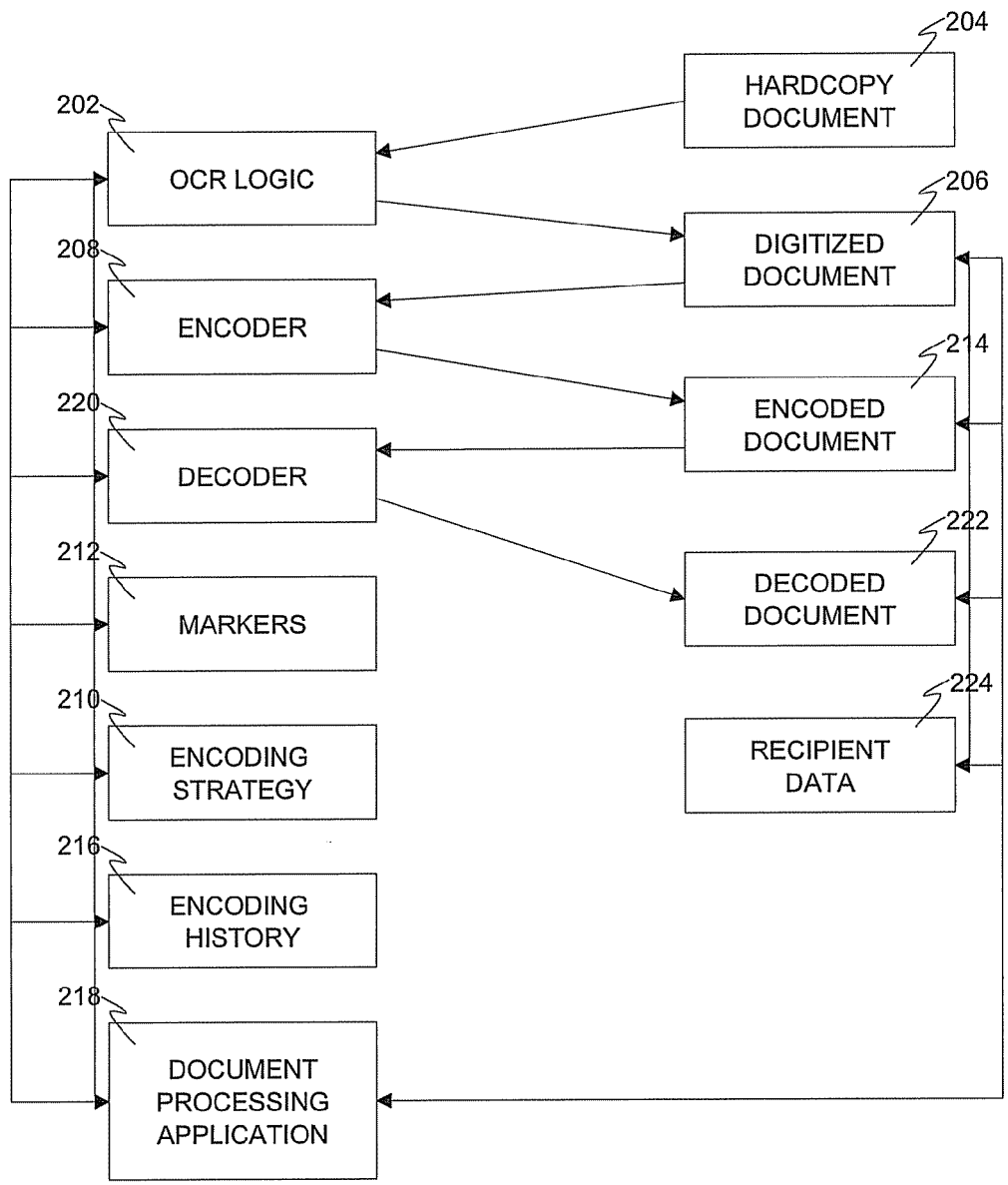
FIG. 2 depicts an example of a document authentication and identification system in accordance with exemplary embodiments.

FIG. 2 depicts an example of a document authentication system 200 in accordance with exemplary embodiments, which may be implemented on the processing system 100 of FIG. 1. In exemplary embodiments, the document authentication system 200 includes optical character recognition (OCR) logic 202 to produce digitized document 206. The scanner 140 of FIG. 1 can be used to capture an image of the hardcopy document 204 for processing by the OCR logic 202. In an alternative embodiment, the document is submitted in electronic form as a digitized document 206, which can be created elsewhere independently from document processing application 218. An encoder 208 receives the digitized document 206, and applies encoding strategy 210 to markers 212, producing an encoded document 214. The encoding strategy 210 holds a number of different strategies that can vary depending upon the markers 212, a target file type of the encoded document 214, and purpose for encoding. The encoder 208 can log information related to the encoding strategy 210, markers 212, digitized document 206 and encoded document 214 in encoding history 216.

A document processing application 218 may invoke the OCR logic 202 and/or the encoder 208 to generate the digitized document 206 and the encoded document 214. The document processing application 218 can also invoke a decoder 220 to produce a decoded document 222. In an exemplary embodiment, the processor unit 160 of FIG. 1 executes instructions to implement the functions of the OCR logic 202, encoder 208, decoder 220, and document processing application 218. In the example depicted in FIG. 2, the digitized document 206, the encoded document 214, and the decoded document 222 can be any electronic file type known in the art, for example, they may be in a text format, or an application specific format.

In an alternate embodiment, there is no original physical hardcopy document 204, and the digitized document 206 represents an electronic file originally created dependently using the document processing application 218. Additionally, the author of the hardcopy document 204 and/or the digitized document 206, whether created independently or dependently from the document processing application 218, may not be aware that the digitized document 206 is being encoded as the encoded document 214.

The encoded document 214 can be output as a physical/hardcopy, analog format for distribution or can be distributed in an electronic format. For example, in the case of a survey, the encoded document 214 may be mailed or e-mailed to a recipient with the expectation of receiving the encoded document 214 back at some point in the future, potentially with additional information added to the encoded document 214. Recipient data 224 holds information regarding potential document recipients, which may include name, address, e-mail, and other contact and permission information. If recipient information is encoded in the encoded document 214, the recipient information can be derived by decoding the encoded document 214 even though the encoded document 214 may appear anonymous. When a physical version of the encoded document 214 is received after distribution, it can be scanned in and converted to an electronic format of the encoded document 214. The decoder 220 attempts to identify embedded information in the encoded document 214. The decoder 220 may search for the markers 212 according the encoding strategy 210 and cross-reference against the encoding history 216 to extract encoded information and produce the decoded document 222. Encoded information that is extracted by the decoder 220 can be used to identify and authenticate the encoded document 214. Non-encoded data (such as title, author, date, etc.) can also be used to identify the encoded document 214. For example, non-encoded data can be extracted from the encoded document 214 to locate an associated record in the encoding history 216, which may further provide information regarding the markers 212 and the encoding strategy 210 for the decoder 220 to apply.

The markers 212 are items that are added or applied to the digitized document 206. The markers 212 can include a variety of subtle changes (such as changes in punctuation, date formats, etc.) to the digitized document 206 that do not alter semantic content in the resulting encoded document 214 unless otherwise approved. The types of markers 212 that can be included in encoded document 214 may depend upon the file type of the digitized document 206 and the encoded document 214. Example file types include DOC, TXT, PDF, JPG, GIF, HTML, and XML, and the others known in the art.

One type of the markers 212 is based on presentation of information. Presentation based markers can be used for image-based documents or documents in which the originator has control of presentation attributes, such as the selection of tailored fonts. Semantically equivalent character substitution can be used for making individual marker variables. For instance, by using a list prefix for survey questions as a marker, difference variations such as: "1)", "1=", "1.", and so forth, can equate to different marker values, where ")" is marker type 1, "=" is marker type 2, "." is marker type 3, and so forth. Larger scale substitutions or rearrangements of character sequences represent another type of markers 212. In a survey or list, the ordering of questions or sentences themselves can be used to encode information. For instance, in a questionnaire, if a particular sentence is used for question 2, the associated marker will have a particular value, but if the same sentence is used for a different question (on a different instance of the same survey) the associated marker has another value. An example of this is illustrated in the sequence of FIGS. 3-5.

FIG. 3 depicts an example of an unmodified survey document 300. The unmodified survey document 300 includes a number of questions or statements: Q1, Q2, . . . , up to Q10. Each question Q1-Q10 has a text statement associated with it. For instance in FIG. 3, text 302 is associated with Q1, text 304 is associated with Q2, and text 306 is associated with Q10. Rearranging the associations between Q1-Q10 with 10 different text blocks, such as text 302-306, can produce up to 3.6288 million permutation possibilities for specific ordering of 10 different items. Equation 1 can be used to determine how many permutations are available for a given number of items and a given number of items to be selected:

$$P(n, r) = \frac{n!}{(n-r)!}, \quad \text{Eq. 1}$$

where n is the number of items available for selection, and r is the number of items to be selected where ($0 \leq r \leq n$). Rearranging fewer elements provides a reduced number of encodings, which may reduce detectability of the encoding to casual observers.

FIG. 4 depicts an example of an encoded survey document 400 in accordance with exemplary embodiments. The encoded survey document 400 includes the same information as the unmodified survey document 300, but the order of information is varied. In FIG. 4 text 302 is still associated with Q1, but text 306 is now associated with Q2 and text 304 is associated with Q10. As a further illustration, FIG. 5 depicts another example of an encoded survey document 500 in accordance with exemplary embodiments. Again, the same semantic information is conveyed in encoded survey document 500 as in encoded survey document 400 and unmodified survey document 300. However, in encoded survey document 500, text 306 is associated with Q1, text 302 is associated with Q2, and text 304 is associated with Q10. Thus, the encoding injected into encoded survey documents 400 and 500 can be extracted by recognizing the modified positions or order of text 302-306 relative to Q1-Q10. The unique encodings on a per document basis can be used to track distribution information, such as encoding a postal zip code with extensions (nine digit "household" zip code level) of a recipient of the encoded survey documents 400 and 500. Higher or lower levels of tracking granularity can be used depending on the number of possible permutations desired.

Returning to FIG. 2, further examples of the markers 212 include augmenting document content with content that does not otherwise appear as validation information. For instance, a signature quote can be selected and inserted into the encoded document 214. The signature quote may include specific characters, words or phrases, which match or equate to a marker value that is calculated from the digitized document 206.

As a further option, the markers 212 can alter document content with the knowledge and permission of the user initiating the encoder 208. For example, the user may provide several variations of a phrase or sentence to substitute in a common location within the document. Sentence syntax can also be altered as another form of the markers 212. The encoder 208 can suggest changing sentence syntax. For instance, by avoiding the use of the verb "to be" or by using an arcane language construct such as an ablative absolute (e.g., "Having read the report, the review committee asked questions"). Syntax alteration is least likely to be noticed when limited to a single or few sentence changes within a long document. Each of the markers 212 may indicate a sentence number that was changed.

The encoder 208 can apply the markers 212 to the digitized document 206 by random selection of markers identified or based upon one or more attributes or characteristics of the digitized document 206, such as the author, originator, message/document content, sender, recipient, location of the recipient, and a creation time stamp. Additionally, the markers 212 can be programmatically created from derived data. For example, each digit of a postal zip code from a recipient's mailing address from recipient data 224, can be encoded in the encoded document 214, with tracking information maintained in the encoding history 216. Whether an actual or derived attribute is used in the encoding strategy 210, the attribute does not necessarily have to be included in the encoded document 214.

The selection of markers 212 in combination with the encoding strategy 210 can be used to validate specific characteristics across different encodings of the same base hardcopy document 204. For example, if person A sends a memo to a distribution list of person B and person C, and uses encoding strategy 210 with markers 212 based on each recipient per the recipient data 224, then each recipient could receive a subtly different version of the encoded document 214. Each recipient version of the encoded document 214 can be verified and instances from other parties would not pass verification. This approach may be used in forensic information leak detection.

The encoding strategy 210 does not have to be applied to every potential applicable instance of the markers 212 within the digitized document 206. For instance, sentence order variation may only change the order of several questions out of a long list of questions, such as those depicted in FIGS. 3-5. The encoding strategy 210 can also select when the markers 212 are applied. The encoding strategy 210 may use a hash or other techniques, which generate characters or strings from which the markers 212 and application of the markers 212 can be selected.

Figure 6:
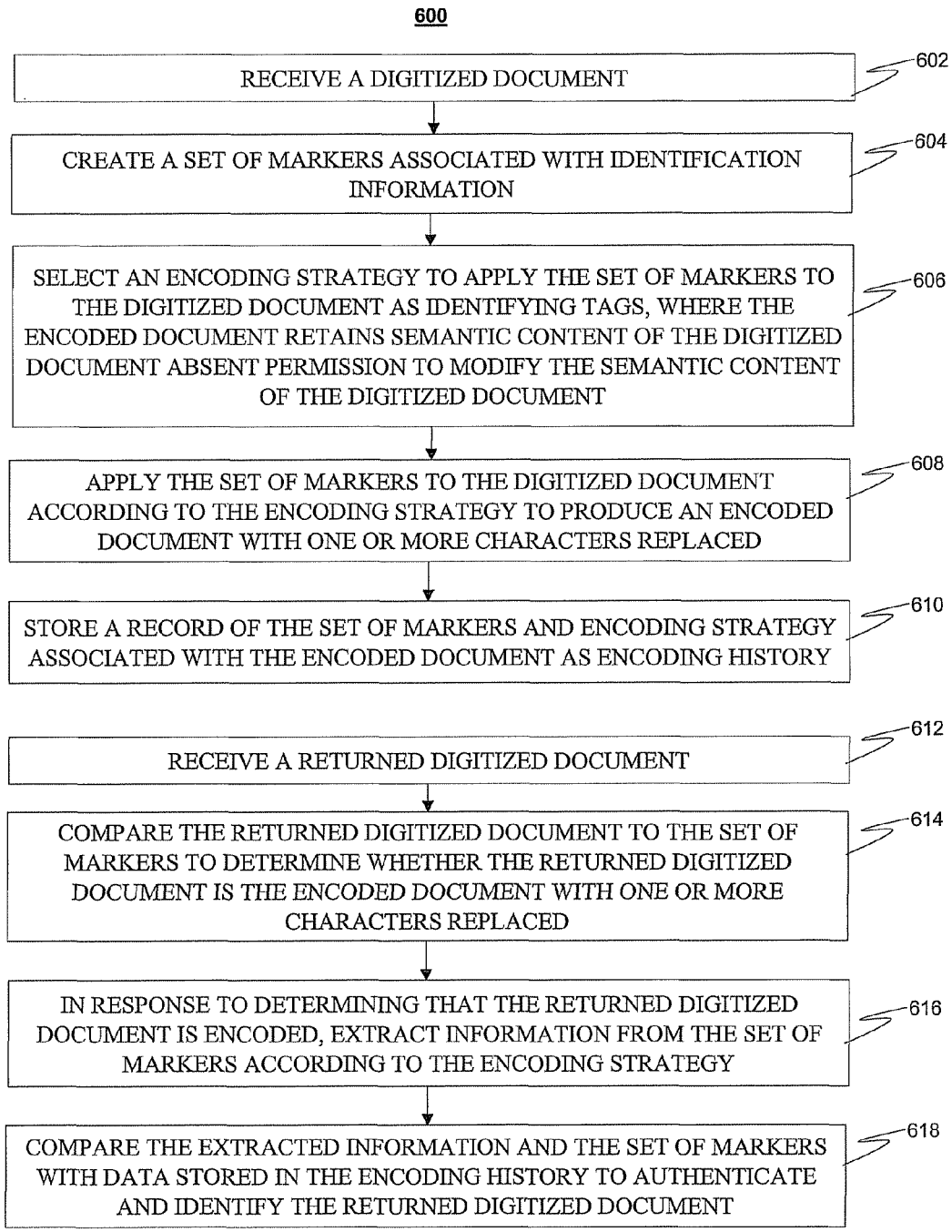
FIG. 6 depicts an exemplary process for document authentication and identification in accordance with exemplary embodiments.

Turning now to FIG. 6, a process 600 for document authentication and identification will now be described in accordance with exemplary embodiments, and in reference to FIGS. 1-5. Digitized document 206 can be created directly using the document processing application 218 on the processing system 100, or the digitized document 206 can be created from hardcopy document 204 via scanner 140 and OCR logic 202. For example, digitized document 206 can represent an electronic version of the unmodified survey document 300. The user of the document processing application 218 may desire to keep the unmodified survey document 300 appearing anonymous, but also desire to extract demographic data about the respondents. In such a case, a mailing envelope sent to each recipient would include the recipient's mailing address, but each uniquely encoded survey and return envelope would appear to be anonymous. The user of the document processing application 218 can initiate the encoder 208 to tag or mark copies of the survey.

At block 602, the encoder 208 receives the digitized document 206. The user can select fields to use as identification information. At block 604, a set of markers 212 associated with identification information is created. The set of markers 212 can be accessed or modified using the document processing application 218 and/or the encoder 208. For this example, it is assumed that the digitized document 206 is a form that is being expanded by word processing, form letter or mail merge software. Copies of the form are based on a mailing list, which contains zip code information regarding the intended recipients from the recipient data 224. Note that the user can determine the granularity of tracking depending upon which fields have been selected.

At block 606, the encoder 208 selects an encoding strategy to apply the set of markers 212 to the digitized document 206 as identifying tags, wherein the encoded documents 214 retain semantic content of the digitized document 206 absent permission to modify the semantic content of the digitized document 206. The encoder 208 examines a number of target documents being created and determines the number of markers 212 required to identify each encoded document 214 based upon the fields selected by the user. The encoder 208 may request that the user select the desired markers.

At block 608, the encoder 208 applies the set of markers 212 to the digitized document 206 according to the encoding strategy 210 to produce encoded documents 214 with one or more characters replaced. The encoder 208 can create uniquely encoded documents 214 for each targeted recipient.

A variety of types of markers 212 can be supported in accordance with exemplary embodiments. For example, the encoder 208 may reorder one or more sentences as the one or more characters replaced, where the set of markers 212 indicate replaced sentence locations according to the encoding strategy 216. Examples of reordering are depicted in FIGS. 3-5. The encoder 208 can also insert a signature quote in response to receiving permission to modify the semantic content of the digitized document 206, where characters in the signature quote equate to the set of markers 212. As a further option, the encoder 208 may modify sentence syntax for at least one sentence in response to receiving permission to modify the semantic content of the digitized document 206, where the set of markers 212 indicate a modification location. The set of markers 212 may be selected based on attributes associated with the digitized document 206, including: author, originator, content, sender, recipient, location of the recipient, and a creation time stamp.

At block 610, a record of the set of markers 212 and encoding strategy 210 associated with the encoded document or documents 214 is stored in encoding history 216. The encoding history 216 can also identify the targeted recipient or recipients. The encoded document or documents 214 can be sent to the recipient or recipients electronically or in a physical hardcopy format.

After a period of time, a returned document is received that may be in a physical format, such as hardcopy document 204 or in a digitized format, such as digitized document 206. A returned physical document can be converted into a digitized format using the scanner 140 and OCR logic 202. The returned digitized document is examined to determine whether it is a specific encoded document 214. At block 612, the decoder 220 receives the returned digitized document. At block 614, the decoder 220 compares the returned digitized document to the set of markers 212 to determine whether the returned digitized document is the encoded document 214 with one or more characters replaced.

At block 616, in response to determining that the returned digitized document is encoded, the decoder 220 extracts information from the set of markers 212 according to the encoding strategy 210. At block 618, the decoder 220 compares the extracted information and the set of markers 212 with data stored in the encoding history 216 to authenticate and identify the returned digitized document. The decoder 220 determines which particular encoded original document 214 has been received, for example, encoded survey document 400 versus encoded survey document 500. By examining the markers 212, the encoding strategy 210, and the encoding history 216, the decoder 220 can extract the zip code of the recipient. For instance, the associations between Q1-Q10 and text 302-306 as depicted in FIGS. 4 and 5 can map to specific zip codes as tracked in the encoding history 216. The decoder may also store the resulting decoded document 222.

The capabilities of the present invention can be implemented in software, firmware, hardware or some combination thereof.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized, such as any of type of memory depicted in FIG. 1 to store instructions for execution of the OCR logic 202, encoder 208, decoder 220, and/or document processing application 218 of FIG. 2. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Technical effects include computer-implemented encoding and decoding of identification information that survives both analog-to-digital and digital-to-analog conversion processes. Subtle encoding techniques using character substitution for individual characters, insertion of signature quotes, sentence reordering and other encoding strategies can result in hiding markers in plain sight. Encoding variations can be applied based on intended recipients of the encoded documents, which later provide authentication and identification information when the encoded documents are returned. Through interpretation of encoded markers, original document attributes can be verified, and tampering or modification of the encoded document can be detected.

The diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated. Moreover, the use of the terms first, second, etc. do not denote any order or importance, but rather the terms first, second, etc. are used to distinguish one element from another.

What is claimed is:

1. A computer-implemented method for encoding identification information in a document, comprising:
   receiving a digitized document;
   creating a set of markers associated with identification information;
   determining whether permission to modify semantic content of the digitized document is given;
   selecting an encoding strategy to apply the set of markers to the digitized document as identifying tags to produce an encoded document based on the determination whether permission to modify the semantic content of the digitized document is given, wherein the encoding strategy includes retaining semantic content of the digitized document based on determining that permission to modify the semantic content of the digitized document is not given, and the encoding strategy includes modifying the semantic content of the digitized document based on determining that permission to modify the semantic content of the digitized document is given; and
   applying the set of markers to the digitized document according to the encoding strategy using an encoder to produce an encoded document with one or more characters added or replaced compared to the digitized document.

2. The method of claim 1 wherein the encoder reorders one or more sentences as the one or more characters replaced, and the set of markers indicate replaced sentence locations according to the encoding strategy.

3. The method of claim 1 wherein when it is determined that permission to modify the semantic content of the digitized document is given, the encoding strategy includes inserting a signature quote into the digitized document, wherein characters, words or phrases in the signature quote equate to the set of markers.

4. The method of claim 1 wherein when it is determined that permission to modify the semantic content of the digitized document is given, the encoding strategy includes modifying sentence syntax for at least one sentence, wherein the set of markers indicate a modification location.

5. The method of claim 1 further comprising:
   selecting the set of markers based on attributes associated with the digitized document, the attributes comprising one or more of: author, originator, content, sender, recipient, location of the recipient, and a creation time stamp.

6. The method of claim 1 further comprising:
   storing a record of the set of markers and encoding strategy associated with the encoded document as encoding history.

7. The method of claim 1 further comprising:
   encoding multiple variations of the digitized document to produce additional encoded documents, wherein the multiple variations target different recipients.

8. A computer-implemented method for document authentication and identification, comprising:
   receiving a digitized document;
   comparing the digitized document to a set of markers to determine whether the digitized document is an encoded document with one or more text characters replaced, wherein the one or more text characters replaced includes at least one letter, number, symbol or space changed to another letter, number, or symbol;
   in response to determining that the digitized document is an encoded document with one or more characters replaced, extracting information from the set of markers using a decoder according to an encoding strategy; and
   comparing the extracted information and the set of markers with data stored in an encoding history to authenticate and identify the received digitized document.

9. The method of claim 8 wherein the decoder determines that the set of markers are reordered sentences as the one or more characters replaced, and the information is encoded in replaced sentence locations according to the encoding strategy.

10. The method of claim 8 wherein the decoder determines that the set of markers comprise at least one of: an inserted signature quote with information encoded in characters of the signature quote, and a modified sentence syntax with the information encoded in a modified location.

11. The method of claim 8 further comprising:
    selecting the set of markers based on attributes associated with the digitized document, the attributes comprising one or more of: author, originator, content, sender, recipient, location of the recipient, and a time stamp.

12. A system for document authentication and identification, comprising:
    an encoder configured to execute on a processing unit and perform a method comprising:

receiving a digitized document;

creating a set of markers associated with identification information;

determining whether permission is given to modify semantic content of the digitized document;

selecting an encoding strategy to apply the set of markers to the digitized document as identifying tags to produce an encoded document based on the determination whether permission is given to modify the semantic content of the digitized document, wherein the encoding strategy includes retaining the semantic content of the digitized document based on determining that permission to modify the semantic content of the digitized document is not given, and the encoding strategy includes modifying the semantic content of the digitized document based on determining that permission to modify the semantic content of the digitized document is given;

applying the set of markers to the digitized document according to the encoding strategy to produce an encoded document with one or more characters replaced or rearranged; and storing a record of the set of markers and encoding strategy associated with the encoded document as encoding history; and a decoder configured to execute on the processing unit and perform a method comprising:

receiving a returned digitized document;

comparing the returned digitized document to the set of markers to determine whether the returned digitized document is the encoded document with one or more characters replaced or rearranged;

in response to determining that the returned digitized document is the encoded with one or more characters replaced or rearranged, extracting information from the set of markers according to the encoding strategy; and comparing the extracted information and the set of markers with data stored in the encoding history to authenticate and identify the returned digitized document.

13. The system of claim 12 further comprising:

optical character recognition (OCR) logic, the OCR logic being configured to execute on the processing unit and create the digitized document and the returned digitized document from one or more scanned images of one or more physical documents; and a document processing application configured to execute on the processing unit and provide interfaces to the encoder, decoder, and OCR logic.

14. The system of claim 12 wherein the encoder is further configured to reorder one or more sentences as the one or more characters replaced; and further wherein the decoder is configured to determine that the set of markers are reordered sentences as the one or more characters replaced, and the information is encoded in replaced sentence locations according to the encoding strategy.

15. The system of claim 12 wherein when it is determined that permission is given to modify the semantic content of the digitized document, the encoding strategy includes inserting one or more of a signature quote and modify sentence syntax for at least one sentence in response to receiving permission to modify the semantic content of the digitized document; and further wherein the decoder is configured to determine that the set of markers comprise at least one of: an inserted signature quote with information encoded in characters of the signature quote, and a modified sentence syntax with the information encoded in a modified location.

16. The system of claim 12 wherein the set of markers are selected based on attributes associated with the digitized document, the attributes comprising one or more of:

author, originator, content, sender, recipient, location of the recipient, and a time stamp.

17. The system of claim 12 wherein the encoder is further configured to encode multiple variations of the digitized document to produce additional encoded documents, the multiple variations targeting different recipients; and further wherein the decoder is configured to identify and authenticate the multiple variations targeting the different recipients from multiple returned digitized documents and to extract from the identified and authenticated multiple variations information about the different recipients.

18. A computer program product for document identification and authentication, the computer program product comprising:

a non-transitory storage medium readable by a processing circuit and storing instructions for execution by the processing circuit for implementing a method, the method comprising:

receiving a digitized document;

creating a set of markers associated with identification information;

determining whether permission is given to modify semantic content of the digitized document;

selecting an encoding strategy to apply the set of markers to the digitized document as identifying tags to produce an encoded document based on the determination whether permission is given to modify the semantic content of the digitized document, wherein the encoding strategy includes retaining the semantic content of the digitized document based on determining that permission to modify the semantic content of the digitized document is not given, and the encoding strategy includes modifying the semantic content of the digitized document based on determining that permission to modify the semantic content of the digitized document is given;

applying the set of markers to the digitized document according to the encoding strategy to produce an encoded document with one or more characters replaced; and storing a record of the set of markers and encoding strategy associated with the encoded document as encoding history.

19. The computer program product of claim 18 wherein the method further comprises:

encoding multiple variations of the digitized document to produce additional encoded documents, the multiple variations targeting different recipients;

identifying and authenticating the multiple variations targeting the different recipients from multiple returned digitized documents; and extracting from the identified and authenticated multiple variations information about the different recipients.

20. The computer program product of claim 18 wherein the method further comprises:

receiving a returned digitized document;

comparing the returned digitized document to the set of markers to determine whether the returned digitized document is the encoded document with one or more characters replaced;

in response to determining that the returned digitized document is the encoded document with one or more characters replaced, extracting information from the set of markers according to the encoding strategy; and
comparing the extracted information and the set of markers with data stored in the encoding history to authenticate and identify the returned digitized document.

* * * * *